US012773000B2

(12) United States Patent
Varvello

(10) Patent No.: US 12,773,000 B2
(45) Date of Patent: Oct. 27, 2026

(54) VEGETABLE FIBRE HYDROLYSATE AND ITS USE IN HUMAN AND ANIMAL DIET

(71) Applicant: HEALLO S.R.L., Milan (IT)

(72) Inventor: Francesca Varvello, Milan (IT)

(73) Assignee: HEALLO S.R.L., Milan (IT)

( * ) Notice: Subject to any disclaimer, the term of this patent is extended or adjusted under 35 U.S.C. 154(b) by 728 days.

(21) Appl. No.: 18/002,923

(22) PCT Filed: Jun. 24, 2021

(86) PCT No.: PCT/IB2021/055618

§ 371 (c)(1),
(2) Date: Dec. 22, 2022

(87) PCT Pub. No.: WO2021/260623

PCT Pub. Date: Dec. 30, 2021

(65) Prior Publication Data

US 2023/0255245 A1 Aug. 17, 2023

(30) Foreign Application Priority Data

Jun. 25, 2020 (IT) ........................ 102020000015268

(51) Int. Cl.
*A23L 7/10* (2016.01)
*A23L 7/104* (2016.01)
*A23L 33/21* (2016.01)

(52) U.S. Cl.
CPC ............... *A23L 7/115* (2016.08); *A23L 7/104* (2016.08); *A23L 33/21* (2016.08)

(58) Field of Classification Search
CPC ........... A23L 7/115; A23L 7/104; A23L 33/21
See application file for complete search history.

(56) References Cited

U.S. PATENT DOCUMENTS 7,993,890 B2 * 8/2011 Soerensen ............ C12N 9/2402 435/320.1
2019/0200640 A1 7/2019 Gil-Martinez et al.

FOREIGN PATENT DOCUMENTS

WO WO-02067698 A1 * 9/2002 ............. A61P 35/00
WO 2016175702 A1 11/2016

OTHER PUBLICATIONS

Annon "Barley malt extract product description", Jun. 1, 2009, database accession No. 1094053.
Annon: "4-in-1 Fiber Product Description" Sep. 1, 2019, Database Accession No. 6861677.
Annon: "Low glycemic nutritional sweetener product description", Jul. 1, 2013, Database Accession No. 2116329.

(Continued)

*Primary Examiner* — Katherine D Leblanc
(74) *Attorney, Agent, or Firm* — Silvia Salvadori, P.C.; Silvia Salvadori

(57) ABSTRACT

A hydrolysate product from a vegetal matrix is disclosed, the process for its preparation, and its uses in human and animal diet. This hydrolysate contains a high percentage of pentosans with a low molecular weight that thus offers high bioavailability of soluble fibres. This enables the drawbacks to be overcome that are associated with high consumption of wholefood products, at the same time benefiting from the nutritional components contained therein.

4 Claims, 4 Drawing Sheets

(56) References Cited

OTHER PUBLICATIONS

Annon: "Report of the scientific committee on animal nutrition on the safety of the enzymatic product allzyme pt for use as feed additive in turkeys for fattening:", Apr. 9, 2003, Retrieved from the internet URL: https://ex.europa.eu/food/system/files/2020-12/sic-com_scan-old_report_out125.pdf.
Batool Qaisrani T. et al., "Arabinoxylans from psyllium husk: A review", Journal of Environmental and Agricultural Sciences, Jan. 1, 2016, pp. 33-39.
Jackowski M. et al., "Brewer's spent grains—valuable beer industry by-product", Biomolecules, vol. 10, No. 12, Dec. 13, 2020, pp. 1669.
Search Report and Written Opinion of PCT/IB2021/055618 of Nov. 16, 2021.
Trojer R., "Comet bio reclaims nutrition with its arrabinaTM prebiotic", Nutraceuticals Now, Apr. 1, 2020, pp. 1-52.

* cited by examiner

VEGETABLE FIBRE HYDROLYSATE AND ITS USE IN HUMAN AND ANIMAL DIET

This application is a U.S. national stage of PCT/IB2021/055618 filed on 24 Jun. 2021, which claims priority to and the benefit of Italian Application No. 102020000015268 filed on 25 Jun. 2020, the contents of which are incorporated herein by reference in their entireties.

FIELD OF THE INVENTION

This invention relates to a hydrolysate product of vegetal fibre, in particular from beets, the process for its preparation and its uses in human and animal diet.

PRIOR ART

Dietary vegetable fibre has long established itself as a component of the diet that has the ability to influence multiple aspects of digestive physiology.

Actually, the positive effect of the consumption of bran and wholemeal cereals is known on intestinal regularity and the prevention of certain pathologies. Only recently, however, several studies have shown that these benefits are not attributable exclusively to the mechanical effect of "dragging and cleaning" that fibre-rich vegetables produce, but also and above all to well-defined molecules comprised in these plant matrices. Dietary vegetable fibre consists of insoluble fibre, i.e. cellulose and lignin, which acts mainly on the functioning of the gastrointestinal tract, favouring the drag and cleaning effect indicated above, because it favours the transit of the food bolus and evacuation in the intestine of faeces. But the dietary vegetable fibre is also composed of soluble fibre, primarily consisting of polysaccharide chains of arabinoxylans belonging to the pentosan family and ferulic acid, an antioxidant molecule associated with pentosanic structures, as shown in FIG. 1.

Such soluble fibres are present not only in cereals, but also in other plants such as for example *Plantago psyllium, Digitaria eriantha*, bamboo shoots, *Lolium*, and also in beets (or *Beta vulgaris* L.).

Besides being rich in sugars, mineral salts and vitamins and other useful substances, beet is attributed dietary and healthy properties: it absorbs toxins from the cells and facilitates their elimination, it is purifying, mineralizing, antiseptic, restorative, promotes digestion, stimulates the production of bile and strengthens the gastric mucosa, cures anaemia, infections of the cerebral system, stimulates the production of red blood cells, dissolves calcium deposits in the blood vessels and prevents their hardening, finally stimulates the lymphatic system.

The edible parts of the beet are the leaves (chard or chard) and the roots. 100 g. of beet leaves contain on average:

water: 89.78 g
sodium: 10 mg
proteins: 1.3 g
potassium: 196 mg
lipids: 0.1 g
iron: 1 mg
glucids: 2.8 g
vitamin A: 263 mg
fibre: 1.2 g
vitamin C: 18 mg 100 g of sugar beet, whose root is used, contain on average:

carbohydrates: 4 g
lipids: 0 g water: 91.3 g
proteins: 1.1 g

Owing to this nutritional value, beets are used in particular in both human and animal diet.

Pentosans, and in particular arabinoxylans, regulate the absorption of sugars and fats, contributing to the control of the level of glucose and cholesterol in the blood. They thus play an active role in reducing glycaemia and controlling hypercholesterolaemia and obesity.

Further, arabinoxylans are known prebiotics that are able to increase faecal bifidobacteria and reduce urinary excretion of p-cresol, thus improving generally intestinal health and the immune system.

Nevertheless, the vast majority of pentosans, including arabinoxylans, and ferulic acid, which are generally present in dietary vegetal fibre, is not bioavailable because it is closely linked to other inert structures like cellulose and lignin.

It is precisely the inability of the digestive tract to break down such structures that has led the probiotic intestinal microflora of the large intestine to produce hydrolytic enzymes that in the presence of dietary fibre separate pentosans and ferulic acid from the compounds to which they are linked, making them bioavailable. Nevertheless, this process is slow and as it occurs only in the final section of the intestine, has very limited results.

Although the positive effects of the consumption of vegetal fibre are established, it has to be noted that consuming a quantity of 8 g. fibre rich in arabinoxylans per 100 g. of carbohydrates can lead to a series of disturbances such as for example swelling, flatulence, colon irritation and resulting abdominal pains due to the insoluble fibre part. Further, the wholefoods that have to be consumed to reach a fibre content rich in arabinoxylans of 8 g. out of 100 g., are in general less palatable and contain lipase inhibitors that make pancreatic lipase ineffective and phytates that are not digestible for human beings or non-ruminant animals, which are classified as anti-nutritional because of the chelating effect on certain nutritional elements. In fact, if they are consumed in large doses, the phytates inhibit the metabolism and absorption of numerous minerals like calcium and the zinc and vitamin B1, making certain proteins indigestible.

A further remark is that the insoluble part of the dietary vegetal fibre can be contaminated by mycotoxins, which alter the immune and neurological system, cause oxidative stress and cause damage to the intestinal barrier.

It is thus the object of the present invention to provide a product with high bioavailability of the aforementioned soluble fibres that at the same time enables the drawbacks associated with high consumption of known wholefood products to be minimised.

SUMMARY OF THE INVENTION

This object has been achieved by a process for preparing a hydrolysate from a vegetal matrix, as claimed in claim 1.

In another aspect, the present invention relates to hydrolysates from a vegetal matrix that are obtainable by this process.

In another aspect, the present invention relates to food compositions, food supplements and food products comprising said hydrolysates from a vegetal matrix.

In a further aspect, the present invention relates to a functional sugar comprising this hydrolysate.

In another aspect, the present invention relates to a process for preparing a phytocomplex using such hydrolysates.

In a further aspect, the present invention relates to the use of the hydrolysate and the products that contain the hydrolysate to reduce the glycaemic index, in particular in the treatment of subjects affected by pathologies such as diabetes, metabolic syndrome, obesity, cardiovascular diseases, where the glycaemic index is greater than normal values.

BRIEF DESCRIPTION OF THE FIGURES

The characteristics and advantages of the present invention will be clear from the detailed description, the embodiments provided by way of illustrative and non-limiting example, and the annexed figures, wherein.

DETAILED DESCRIPTION OF THE INVENTION

Figure 1:
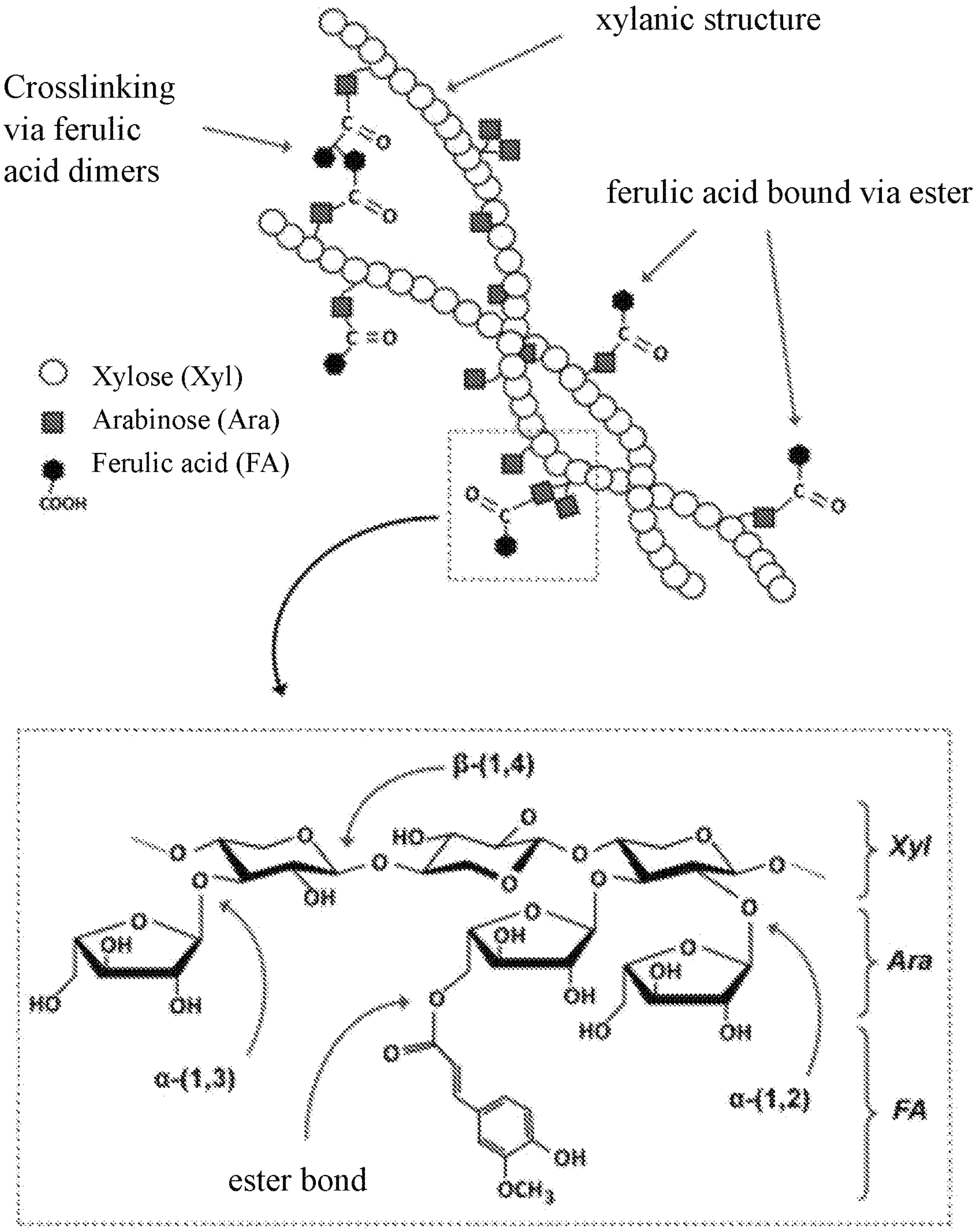
FIG. 1 illustrates the typical structure of the soluble fraction of a dietary vegetal fibre.

The invention therefore relates to a process for preparing a hydrolysate from a vegetal matrix, said process comprising the steps of:

i) mixing vegetal matrix and water, in a weight ratio of 1:1 to 1:5, ii) adding to the so obtained mixture up to 2 wt %, based on the mixture weight, of an enzyme complex consisting of:

a) xylanase and pectinase, or b) xylanase, pectinase, amylase and glucanase, and leaving to react for at least 6 hours at a temperature of 45-65° C. and at a pH of 3-6, iii) deactivating the enzyme complex of step ii), by increasing the temperature to 80-90° C. for at least 5 minutes, and iv) separating the liquid component from the solid component as obtained at the end of step iii), while keeping the liquid component, i.e. the hydrolysate from the vegetable matrix, wherein said vegetal matrix is selected from a cereal, *Plantago psyllium, Digitaria eriantha*, bamboo shoots, *Lolium*, beet, their components and their mixtures.

The term "cereal" means wheat, barley, rice, rye, buckwheat, maize, oats, sorghum, millet, or a mixture thereof.

Preferably, this vegetal matrix is beet or components thereof.

As will be seen below, not only this process enables a hydrolysate to be obtained that is advantageously enriched with pentosans having medium and low molecular weight, thus a hydrolysate enriched in the soluble fraction of the vegetal matrix, but also enables those components, that are typically wasted, to be reused.

The solid component that remains from step iv), i.e. the exhausted vegetal matrix in which mostly cellulose and lignin are present, can be advantageously used for agriculture, both as such and in granular or pelletized form. Alternatively, the exhausted vegetal matrix can be appropriately used as a substrate for the growth of microorganisms, e.g. of the type *Trichoderma*, which are useful in agriculture, e.g. to protect against so-called pruning wounds or as anti-phytopathogen agents.

The process of the invention is therefore particularly advantageous since it uses an easy-to-find vegetal matrix as a raw material and all the resulting waste materials have an intended use, thus eliminating the overall waste.

Preferably, said xylanase is endo-1,4-beta-xylanase.

Preferably, said pectinase is polygalacturonase, pectinaesterase, or a mixture thereof.

Preferably, said amylase is alpha-amylase.

Preferably, said glucanase is endo-1,3(4)-beta-glucanase.

In other preferred embodiments, in the step i), vegetal matrix and water are in a weight ratio of 1:1.5 to 1:3.

In other preferred embodiments, in step ii), the enzyme complex is added in an amount up to 1 wt %, based on the mixture weight. In more preferred embodiments, in step ii), the enzyme complex is added in an amount of 0.1-0.7 wt %, based on the mixture weight.

In further preferred embodiments, in step ii), the mixture is left to react for 10-20 hours at 45-60° C.

In step iii), the enzyme complex is deactivated by heat treatment, i.e. by raising the temperature. Preferably, deactivation occurs at about 85° C. for about 15 minutes.

In step iv), the liquid component can be separated by known filtration or centrifugation techniques or both techniques. Also, possible further washes with water are possible.

The hydrolysate of the invention is thus advantageously a source of soluble fibre that is substantially devoid of lignin and cellulose that does thus not cause phenomena of irritation of the colon and resulting flatulence and abdominal pains.

Optionally, the process of the invention further comprises a step v) of drying the liquid component coming from step iv), thus obtaining a dry hydrolysate from a vegetal matrix. The drying step v) is preferably performed at temperatures not higher than 65° C. This drying step v) can be performed by atomization or lyophilisation.

In another aspect, the present invention relates to a hydrolysate from a vegetal matrix obtainable by the process disclosed above, said hydrolysate comprising water, pectin, 10-50 wt % of arabinoxylans and 1-10 wt % of sugars selected from glucose, xylose, arabinose, galactose and mixtures thereof, based on the weight of the dry hydrolysate.

The expression "dried hydrolysate" or "dry hydrolysate", means a hydrolysate subjected to drying. A dried or dry hydrolysate is deemed to have a residual water content that is not higher than 1 wt %, based on the weight of the dried hydrolysate.

Preferably, the hydrolysate from a vegetal matrix comprises 15-40 wt % of pentosans having a numeric average molecular weight not higher than 30 kDA, based on the weight of the dried hydrolysate.

Preferably, the hydrolysate from a vegetal matrix comprises a mixture of glucose, xylose, arabinose, and galactose.

Preferably, the hydrolysate from a vegetal matrix comprises 2-6 wt % of glucose, based on the weight of the dried hydrolysate.

Preferably, the hydrolysate from a vegetal matrix comprises 0.5-5 wt % of xylose, based on the weight of the dried hydrolysate.

Preferably, the hydrolysate from a vegetal matrix comprises 15-2 wt 5% of a mixture of arabinose and galactose, based on the weight of the dried hydrolysate.

It has been surprisingly observed that the presence of the selected enzymes, in the process conditions indicated above, enables the more soluble parts such as arabinoxylans, pectins and sugars, to be released from the vegetal matrix.

In other preferred embodiments, the hydrolysate from a vegetal matrix of the invention is a dry hydrolysate. The fact of having a dry product offers a series of advantages ranging from the manageability of reduced volumes compared to corresponding aqueous solutions, to the consequent ease of transport, as well as to the duration of storage, due to the significant reduction of both the risk of bacterial contamination and the risk of rancidity. Of course, if circumstances require it, the hydrolysate could easily be solubilized in water to bring the product in liquid form to the desired concentration. The determination of the pentosans is based on a rapid and reproducible colorimetric phloroglucinol-based method (S. G. Douglas, "*A rapid method for the determination of pentosans in wheat flour*", Food Chemistry, 7, 1981, 139-145) using as a reference standard D-xylose, at 510-552 nm. As the method provides high temperature acid hydrolysis, all the pentosans are counted independently of the degree of polymerization thereof. For the purposes of the present invention, the numeric average molecular weight (Mn) of the pentosans in the hydrolysate is measured by diafiltration on screens with different molecular cut-offs: 50 kDa, 30 kDa, 10 kDa and 5 kDa.

The above process has shown that the selection of the enzyme complex not only enables the active soluble molecules to be separated from the inactive insoluble matrix of the vegetal matrix, but also enables the average molecular dimensions of said active molecules to be reduced to molecular dimensions that are easily usable and exploitable inside the organism. In fact, the digestion of a molecular complex of the order of magnitude of a few microns is slow and difficult compared to the digestion of molecules of the order of magnitude of a few kilodalton. (KDa).

In some embodiments, said hydrolysate from a vegetal matrix of the invention consists essentially of water, pectin, 10-50 wt % of arabinoxylans and 1-10 wt % of sugars selected from glucose, xylose, arabinose, galactose and mixtures thereof, based on the weight of the dried hydrolysate. The expression "consists essentially of" means that these components are the only active ingredients present in the hydrolysate, whereas any further components or excipients do not interfere with the action thereof. It should be understood that all the aspects identified above as preferred and advantageous for the hydrolysate and the components thereof are to be deemed to be equally preferred and advantageous also for these embodiments.

In other embodiments, said hydrolysate from a vegetal matrix of the invention consists of water, pectin, 10-50 wt % of arabinoxylans and 1-10 wt % of sugars selected from glucose, xylose, arabinose, galactose and mixtures thereof, based on the weight of the dried hydrolysate.

It should be understood that all the aspects identified above as preferred and advantageous for hydrolysate and the components thereof are to be deemed to be equally preferred and advantageous also for these embodiments.

In a further aspect, the present invention relates to the use of the hydrolysate as disclosed above for the reduction of the glycaemic index, in particular in the treatment of subjects affected by pathologies such as diabetes, metabolic syndrome, obesity, cardiovascular diseases, in which the glycaemic index exceeds normal values.

In another aspect, the present invention relates to functional sugar comprising sugar and at least one hydrolysate, as disclosed above.

In this case, "sugar", is white sugar (or "table" sugar), and also cane sugar (or "brown" sugar, because it contains molasses), a sweetener, or a mixture thereof, to be used for sweetening food.

White sugar consists essentially of sucrose and can be in the form of:

- agglomerated sugar: when the sugar is still damp it is given the shape of a lump and is dried;
- ground and sifted sugars: the sugar is ground and sifted upon leaving refining, the coarser part is the granulated sugar whereas the finer sugar is ground further and becomes icing sugar;
- special sugars: syrups are part of this category (70% water solutions), candy sugar (sugar in 1-2 cm crystals) and instant sugar (very soluble sugar obtained by drying high purity sugar).

In relation to the type of raw material used for its production, there are the following types of sugar:

- brown sugar
- beet sugar
- grape sugar
- maple sugar
- palm sugar
- coconut sugar There are moreover different types of non-refined sugar such as jaggery and muscovado sugar.

A "sweetener" is any natural or artificial sweetening agent like for example fructose, sorbitol, xylitol, mannitol, polydextrose, thaumatin, miraculin, stevioside, glycyrrhizin, saccharin, acesulfame K, aspartame, cyclamate, or a mixture thereof.

Preferably, the functional sugar comprises up to 15 wt % of said at least one hydrolysate of the invention.

More preferably, the functional sugar comprises 1-10 wt % of said at least one hydrolysate of the invention.

Functional sugar can be prepared by mixing the sugar with the hydrolysate and then drying the resulting functional sugar, preferably at temperatures not above 40° C.

In a further aspect, the present invention relates to the use of the functional sugar as disclosed above for the reduction of the glycaemic index, in particular in the treatment of persons affected by pathologies such as diabetes, metabolic syndrome, obesity, cardiovascular diseases, in which the glycaemic index is above normal values.

In another aspect, the present invention also relates to a food composition comprising at least one hydrolysate from a vegetal matrix. In fact, as depending on the enzyme complex used, the resulting hydrolysate shows active components in different concentrations, the possibility of combining different hydrolysates according to different nutritional needs is deemed to be advantageous.

In a further aspect, the present invention relates to a food product comprising at least one hydrolysate from a vegetal matrix, or the food composition, said food product being an edible product chosen from bakery products, animal feed, nutraceutical supplements, alcoholic beverages, non-alcoholic beverages, energy drinks, diet bars, food oils, so-called "breakfast cereals", fresh pasta, dry pasta, yoghurt, ice cream, fruit juice and sweetmeats such as chocolate.

Preferably, said food product is a bakery product.

Preferably, said food product is chocolate.

Preferably, said food product is an alcoholic or non-alcoholic beverage, like beer.

In a further aspect, the present invention relates to a dietary supplement for both human and animal use, comprising at least one hydrolysate from a vegetal matrix, or the food composition.

According to a still further aspect, the present invention relates to a medical device for both human and animal use, comprising at least one hydrolysate from a vegetal matrix, or the food composition. Examples of medical devices include molecular complexes that act owing to the polysaccharide component of arabinoxylans (molecular weight>20,000 Dalton), provided with high affinity for mucus, which owing to the viscous properties thereof, form a barrier effect that is able to reduce and modulate the absorption of sugars and reduce postprandial glycaemic increases.

In a further aspect, the present invention relates to the use of the food composition or of the food product or of the medical device, as disclosed above, to reduce the glycaemic index, in particular in the treatment of persons affected by pathologies such as diabetes, metabolic syndrome, obesity, cardiovascular diseases, in which the glycaemic index is above normal values.

Under a further aspect, the present invention relates to a process for preparing a phytocomplex involving the use of the hydrolysates disclosed above, and the thus obtained phytocomplexes.

In particular, the process for preparing a phytocomplex comprises the steps:

A) preparing a fermentation broth starting from said first hydrolysate from a vegetal matrix, or from said second hydrolysate from a vegetal matrix, or from the food composition comprising both, B) stabilising the fermentation broth pH at 3 to 6.5, C) inoculating the fermentation broth with a first mother culture of at least one microorganism selected from *Komagataeibacter xylinus, Komagataeibacter swingsii, Komagataeibacter rhaeticus*, and mixtures thereof, or with a second mother culture of at least one microorganism selected from *Streptococcus thermophilus, Lactobacillus* debruecki *bulgaricus, Lactobacillus helveticus, Lactobacillus plantarum, Lactobacillus casei*, and mixtures thereof, D) leaving the broth to ferment, E) deactivating the fermented broth, and F) purifying the deactivated fermented broth to obtain a phytocomplex.

Preferably, preparing the culture broth in step B) comprises controlling some parameters within set value intervals, in particular:

- the pH is 3.0-6.5, preferably 3.0-4.3, still more preferably about 3.5;
- the concentration of dissolved solids measured in brix degrees is 8-25, preferably 13-20, still more preferably about 15;
- the temperature is 20-45° C., preferably 24-28° C., still more preferably about 27° C.;
- the concentration of the dissolved oxygen is 8-40 mg/L, preferably 12-20 mg/L, still more preferably about 16 mg/L.

In step d), the fermentation broth is inoculated with at least one microorganism, which constitutes the so-called fermentation starter. Preferably, said microorganism in the first mother culture is *Komagataeibacter xylinus*; preferably, said microorganism in the second mother culture is *Streptococcus thermophilus*, or *Lactobacillus* debruecki *bulgaricus*.

The amount of inoculated microorganism is 102-109 UFC/ml, preferably 104-107 UFC/ml, still more preferably it is of the order of 104 UFC/ml, with a dose of inoculum of 0.1-20 wt %, preferably 0.2-5 wt %, still more preferably 0.3-1 wt %.

Fermentation step D) is preferably conducted in the following conditions:

- pH of 2.5-6.0, more preferably 2.5-3.8, still more preferably about 3.0;
- temperature of 10-32° C., more preferably 18-30° C., still more preferably about 28° C.;
- the concentration of the dissolved oxygen is 8-40 mg/L, more preferably 12-20 mg/L, still more preferably about 16 mg/L;

In preferred embodiments, fermentation step D) is conducted:

- for a period of 5-240 hours, more preferably 5-160 hours, still more preferably 7-20 hours; and
- until a bacterial load of $10^3$-$10^7$ UFC/ml is reached, more preferably $10^4$-$10^6$ UFC/ml, still more preferably in the order of $10^5$ UFC/ml.

It should be appreciated and advantageous that the fermented culture broth that is obtainable at the end of step D) can be used as a fermentation starter in bakery products.

It should be also appreciable and advantageous that the deactivated fermented culture broth obtainable at the end of step E) can be used in prebiotic products to give reinforced prebiotic products.

In a further aspect, the present invention relates to a phytocomplex that is obtainable from the process disclosed above, for use as an intestinal regulator.

In a further aspect, the present invention relates to a phytocomplex that is obtainable from the process disclosed above, for topical use as a cicatrizing agent.

From what was disclosed and discussed above, it is clear that the object has been achieved by providing a product with high bioavailability of soluble fibres, i.e. hydrolysates from a vegetal matrix, which at the same time enables the drawbacks to be reduced that are associated with high consumption of known wholefood products.

It should be understood that all possible combination of preferred aspects of the process for preparing hydrolysate, uses thereof and of the products that contain hydrolysate as are indicated above are disclosed and are thus equally preferred.

It should be further understood that all the aspects identified as preferred and advantageous for the hydrolysate and components thereof must be deemed to be equally preferred and advantageous also for preparing and using the hydrolysate.

Below are working examples of the present invention provided for illustrative purposes.

EXAMPLE

Example 1

Two hydrolysates made from beets, rich in arabinoxylans and pectin, were prepared according to the present invention. The preparation comprised the steps of:

- hydrolysis,
- separation, and
- concentration.

The experiments were conducted both on beet pellets and pulp.

Hydrolysis Step:

The hydrolysis step was conducted by stirring at a temperature T=50° C. for a period equal to 16 hours. These process parameters were chosen that are deemed to be optimum for each enzyme solution used:

Enzyme solution 1 (PE1): endo-1,4-beta-xylanase+alpha-amylase+endo-1,3(4)-beta-glucanase (0.02% of the total mass)+polygalacturonase (0.2% of the total mass).

This enzyme solution frees more arabinoxylans, but a shorter chain than the second.

Enzyme solution 2 (PE4): endo-1,4-beta-xylanase (0.02% of the total mass)+polygalacturonase (0.2% of the total mass)

This enzyme solution frees fewer arabinoxylans, but in a longer chain than the first.

The hydrolysis step was conducted in the following dry/water concentrations:

Pellet solution: 8% pellets-Mains water: 92%

Pulp solution: 30-32% pulp-Mains water: 68-70%

The following pH values are obtained:

Pellet solution: the pH of the solution is about 5.5 (the addition of chemical compounds is not necessary).

Pulp solution: the pulp has already undergone a partial process of microbial degradation and thus has a much more acid pH, around 3.5. The solution has a "strong" odour that will partially remain throughout the entire process up to the formation of the liquid concentrate. The result of the hydrolysis step is an extremely viscous "suspension", in both cases.

Separation Step:

In order to separate the viscous solution obtained, i.e. separate the liquid part (containing arabinoxylans and soluble pectins) from the solid part, it is possible to operate by filtration (for example filter press) or centrifugation (very effective for separation and can also be performed continuously).

The results of the separation step are:

liquid part (hydrolysate) containing arabinoxylans and pectins. On the basis of an estimate based on enzyme conditions, the hydrolysate derivate contains 1-2% arabinoxylans.

Solid part (waste), which could still contain useful substances, could therefore be subjected to a second hydrolysis step.

Concentration Step:

The concentration is achieved by a vacuum evaporation process with a rotating evaporator.

The result is an extremely viscous product, of a consistency similar to that of molasses with a 70% dry substance content both for the pulp sample and for the pellet sample.

Analysis of the Samples Obtained:

F4: hydrolysate (30% biomass) from PE1 enzyme solution

F5: hydrolysate (30% biomass) from PE4 enzyme solution

| | F4 | F5 |
|---|---|---|
| Water | 29.69% | 31.62% |
| dry substance | 70.31% | 68.38% |
| pentose sugars: | 36.01% | 40.29% |
| xylose | 2.35% | 2.56% |
| arabinose + galactose | 15.9%-19.24% | 18.77%-22.7% |
| arabinoxylans | 17.76%-33.66% | 18.96%-37.73% |
| glucose | 4.7% | 3.56% |
| pectin reactive to pectolyase | not detected | not detected |

Example 2

Preparation of White Sugar with the Hydrolysate of the Invention Added.

The hydrolysates F4 and F5 of Example 1 were used.

Dosage:

6% of the wet hydrolysate was dosed, the equivalent of 4% of dry substance (6*70%=4%). In absolute terms, 4 gram of dry substance derived from the concentrate to 100 grams of white sugar were used.

Process:

The product was dried at T=37° C.

Colour:

The colour of the final product is similar to that of the sugar that is already in production today, thus being suitable for several types of application (from sweetening coffee to use in a mixture to any other industrial application).

The following were obtained:

white sugar with F4 added white sugar with F5 added

Example 3

Measuring the Glycaemic Index in 3 Different Types of Sugar

The glycaemic index of a food is a dynamic determination of the glycaemic power of a food and, consequently, the capacity thereof to induce the secretion of insulin. In the literature, numerous scientific studies exist demonstrating that a diet with a low glycaemic index (IG) reduces the risk of diabetes, the risk of cardiovascular diseases, and the metabolic syndrome, protects against chronic inflammation and is particularly recommended as a nutritional approach for certain types of cancer. Clinical experiments have shown that diets with a low GI improve glycaemic control in diabetes, improve insulin sensitivity and the function of the type β pancreatic cells present in the Langerhans islands, and determine effects in reduced demand for food and thus control of body weight and a reduction in haematic cholesterol. Effects on memory modulation are moreover described in the literature.

The objective of this study is to measure the glycaemic response of 3 sugars, as follows:

1. white sugar (of the company Italia Zuccheri);
2. white sugar with added hydrolysate F4 (Example 2)
3. white sugar with added hydrolysate F5 (Example 2)

Materials and Methods:

The method that is recommended scientifically and used in this study for measuring the glycaemic index is standardized according to scientifically validated protocols (Philippou E. et al. The influence of glycemic index on cognitive functioning: a systematic review of the evidence. Adv Nutr. 2014; 5(2):119-130. Published 2014 Mar. 1). The method was also supplemented by the recommendations of Wolever et al. (Kaplan R J et al. Cognitive performance is associated with glucose regulation in healthy elderly persons and can be enhanced with glucose and dietary carbohydrates. Am J ClinNutr 2000; 72:825-36).

The glycaemic response was evaluated of the 3 products after 5 grams of each product had been taken. The order in which the foodstuffs were tested is randomised.

The glycaemic response was measured in 10 healthy male and female volunteers who had no family history of diabetes or other pathologies associated with an altered glycaemic clinical picture.

For each foodstuff to be tested, the individuals were evaluated on different days and the products were administered in the morning at about 09:00 after a 10-12 hour overnight fast. For each test, a blood sample was taken from the individual who had been fasting. Within the following 15 minutes, the individual had consumed the test foodstuff. Subsequent blood samples were taken 15, 30, 45, 60, 90, 120 minutes after ingestion of the foodstuff, in accordance with the protocol of Wolover et al., During the meal, the individuals could have only water. In order to determine the glycaemia, a full blood sample was used by taking a capillary blood sample using OneTouch Ultra Easy of the company LifeScan, which provides the glucose value in mg/100 ml.

Results and Conclusions

For each volunteer and for each foodstuff to be tested, the incremental area below the glycaemic response curve (AUC1) was calculated by the ORIGIN mathematical and statistical analysis software. For the three tested sugars, the mean glycaemic response was evaluated. Lastly, the relative ratio to the simple sugar was calculated.

The data are set out in Table 1 as an average and the mean squared error (MSE) (Table 1) of the 10 volunteers.

Figure 2:
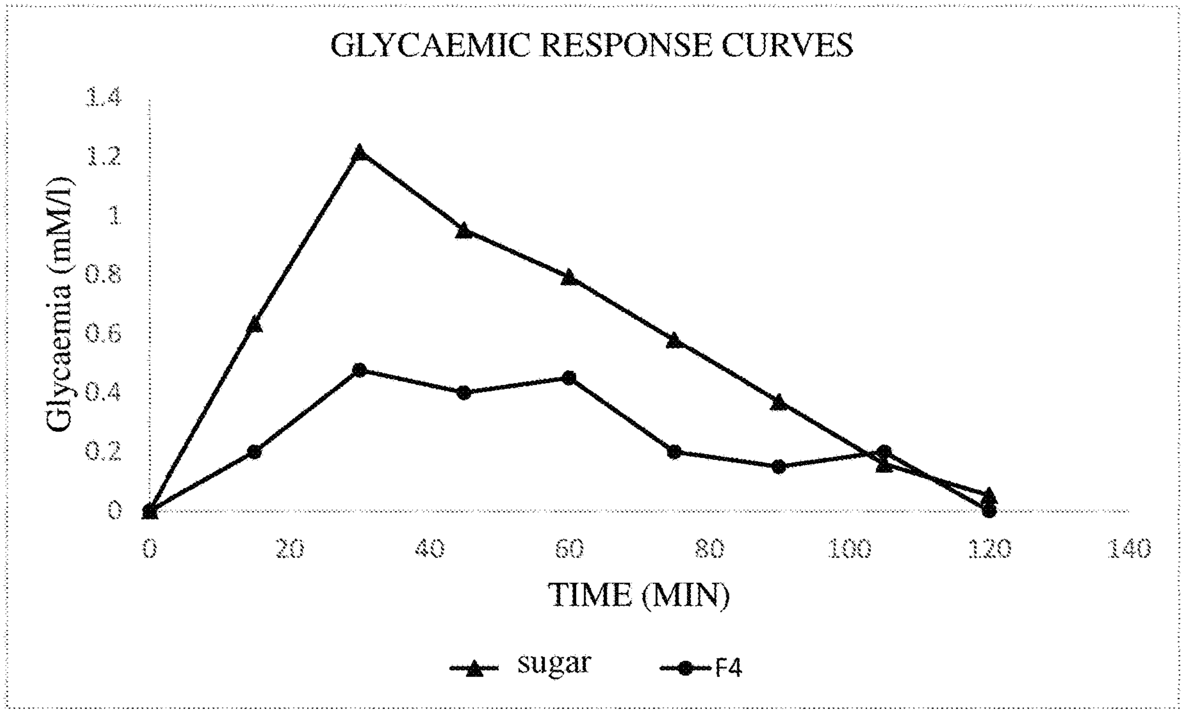
FIG. 2 illustrates the glycaemic curves in response to the white sugar and to the sugar added with the hydrolysate of the present invention, as in Example 3.

FIG. 2 shows, by way of example, the glycaemic curves of a volunteer in response to the white sugar (indicator ▲) and to the sugar with F4 (indicator ■).

Figure 3:
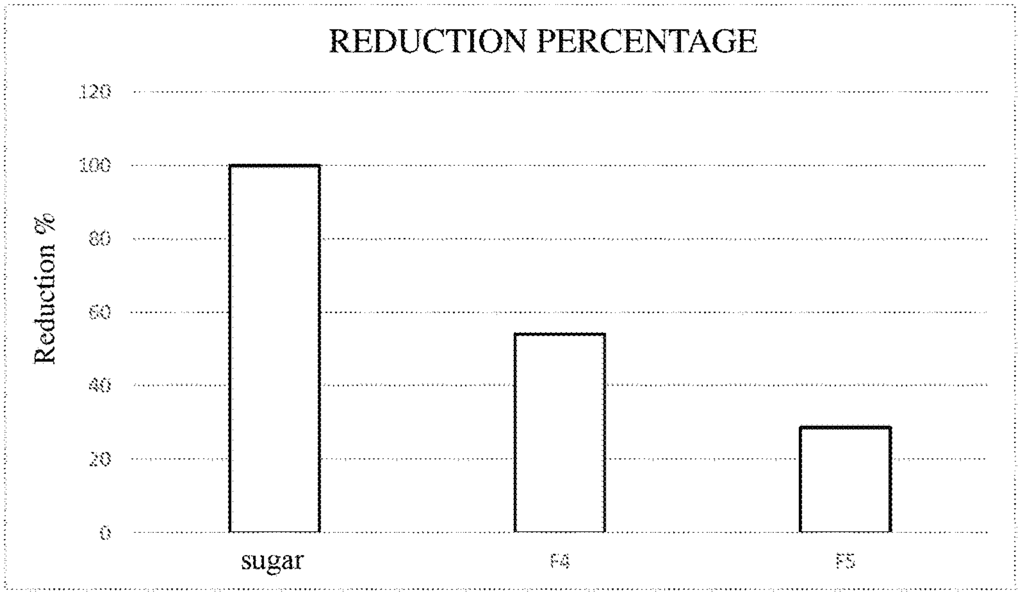
FIG. 3 illustrates the reduction of the glycaemic index, as in Example 3.

FIG. 3 confirms on the other hand the average significant reduction of the glycaemic index, which in percentage showed the following surprising values.

Table 1.

TABLE 1

| | AREA (mMol/min) MEAN | MEAN QUADRATIC ERROR | % REDUCTION OF THE GLYCAEMIC INDEX |
|---|---|---|---|
| WHITE SUGAR | 48.4 | 5.4 | // |
| WHITE SUGAR WITH F4 | 22.2 | 2.8 | −54.18% |
| WHITE SUGAR WITH F5 | 34.5 | 3.3 | −28.6% |

Example 4

Preparation of Hydrolysates from Cereals and Components Thereof.

The preparation of Example 1 was repeated but in this case the vegetal matrix used was cereal, or cereal components, as indicated in the Table below.

For samples 1-6, the enzyme complex PE1 was used, whereas for samples 7-15 the enzyme complex PE4 was used.

Table 2, shows the values of pentosan (PENTO), xylose (XYL), and arabinoxylans (ARA) present in the resulting hydrolysates.

Table 2.

Biomass 15% (w/v) - Temperature 50° C. - pH 4.5 - Enzyme 0.2%

| | PENTO | XYL | ARA | PENTO-REAL | | |
|---|---|---|---|---|---|---|
| 1 | 2.301 | 0.019 | 0.017 | 2.27 | OATS | E4 |
| 2 | 0.689 | 0.034 | 0.130 | 0.53 | MIDDLINGS | |
| 3 | 7.631 | 3.418 | 1.613 | 2.60 | HARD WHEAT BRAN | |
| 4 | 7.627 | 3.471 | 1.418 | 2.74 | SOFT WHEAT GROATS | |
| 5 | 11.159 | 3.655 | 2.061 | 5.44 | SOFT WHEAT SHARPS | |
| 6 | 10.726 | 3.715 | 1.779 | 5.23 | SOFT WHEAT BRAN | |
| 7 | 3.991 | 0.784 | 1.144 | 2.06 | OATS | E1 |
| 8 | 1.955 | 0.346 | 0.698 | 0.91 | MIDDLINGS | |
| 9 | 9.124 | 3.432 | 1.734 | 3.96 | HARD WHEAT BRAN | |
| 10 | 6.790 | 2.912 | 1.866 | 2.01 | SOFT WHEAT GROATS | |
| 11 | 6.300 | 3.162 | 2.168 | 0.97 | SOFT WHEAT SHARPS | |
| 12 | 5.504 | 2.893 | 2.064 | 0.55 | SOFT WHEAT BRAN | |
| 13 | 7.920 | 3.223 | 2.145 | 2.55 | SOFT WHEAT GROATS | E1* |
| 14 | 6.860 | 3.014 | 2.097 | 1.75 | SOFT WHEAT SHARPS | |
| 15 | 5.790 | 3.068 | 2.348 | 0.37 | SOFT WHEAT BRAN | |
| | mg/ml | mg/ml | mg/ml | mg/ml | | |

Example 5

Preparation of Sugar with the Hydrolysate of the Invention Added.

The hydrolysate F4 of Example 1 was used; the dry substance derived from the concentrate was dosed so as to use 3% in weight, of 100 grams of sugar.

The end product (sugar with added hydrolysate F4) was prepared as disclosed in Example 2, modifying suitably the hydrolysate concentration. In this manner:

white sugar with added F4 (3%) was obtained.

Example 6

Measuring the Glycaemic Index in 4 Different Types of Sugar

The objective of this study is to measure the glycaemic response of 4 sugars, as follows:

1. white sugar;
2. white sugar with added hydrolysate F4 (Example 5)
3. demerara brown sugar for Malawi
4. sugar beet sugar.

Materials and Methods:

The method that is recommended scientifically and used in this study for measuring the glycaemic index is standardized according to scientifically validated protocols (Philippou E. et al. The influence of glycemic index on cognitive functioning: a systematic review of the evidence. Adv Nutr. 2014; 5(2):119-130. Published 2014 Mar. 1). The method was also supplemented by the recommendations of Wolever et al. (Kaplan R J et al. Cognitive performance is associated with glucose regulation in healthy elderly persons and can be enhanced with glucose and dietary carbohydrates. Am J ClinNutr 2000; 72:825-36).

The glycaemic response was evaluated of 4 products after 5 grams of each product had been taken. The order in which the foodstuffs were tested is randomised.

The glycaemic response was measured in 10 healthy male and female volunteers who had no family history of diabetes or other pathologies associated with an altered glycaemic clinical picture.

For each foodstuff to be tested, the individuals were evaluated on different days and the products were administered in the morning at about 09:00 after a 10-12 hour overnight fast. For each test, a blood sample was taken from the individual who had been fasting. Within the following 15 minutes, the individual had consumed the test foodstuff. Subsequent blood samples were taken 15, 30, 45, 60, 90, 120 minutes after ingestion of the foodstuff, in accordance with the protocol of Wolover et al., During the meal, the individuals could have only water. In order to determine the glycaemia, a full blood sample was used by taking a capillary blood sample using OneTouch Ultra Easy of the company LifeScan, which provides the glucose value in mg/100 ml.

Results and Conclusions

For each volunteer and for each foodstuff to be tested, the incremental area below the glycaemic response curve (AUC1) was calculated by the ORIGIN mathematical and statistical analysis software. For the four tested sugars, the mean glycaemic response was evaluated. Lastly, the relative ratio to the simple sugar was calculated.

The demerara for Malawi cane sugar determined reactive hypoglycaemia in 7-10 volunteers after an average time of 85±11.4 minutes from consumption of the food. The sugar beet sugar determined reactive hypoglycaemia in 8-10 volunteers after an average time of 66.4±11.3 minutes from consumption of the food.

The data obtained from these 2 types of sugar indicate that the kinetics of the glycaemic response is such as to trigger rapidly reactive hypoglycaemia. Accordingly, the area below cannot be calculated because it would be underestimated and not be comparable with any of the measurements taken.

Figure 4:
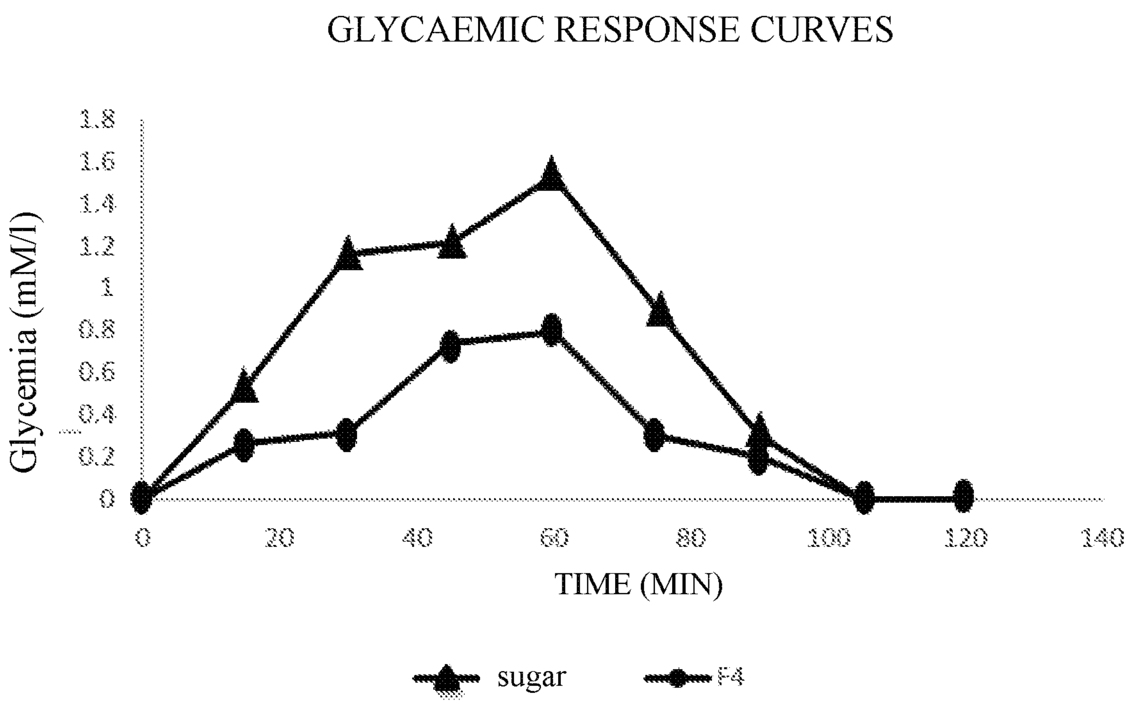
FIG. 4 illustrates the glycaemic curves in response to the white sugar and to the sugar with added hydrolysate of the present invention, as in Example 6.

The data for white sugar and for white sugar with F4 are shown in Table 3 as an average and mean quadratic error (MSE) of the 10 volunteers, and as a reduction percentage. FIG. 4 shows, as an example, the glycaemic curves of a volunteer in response to the simple sugar (indicator ▲) and to the sugar with F4 (indicator ●).

Figure 5:
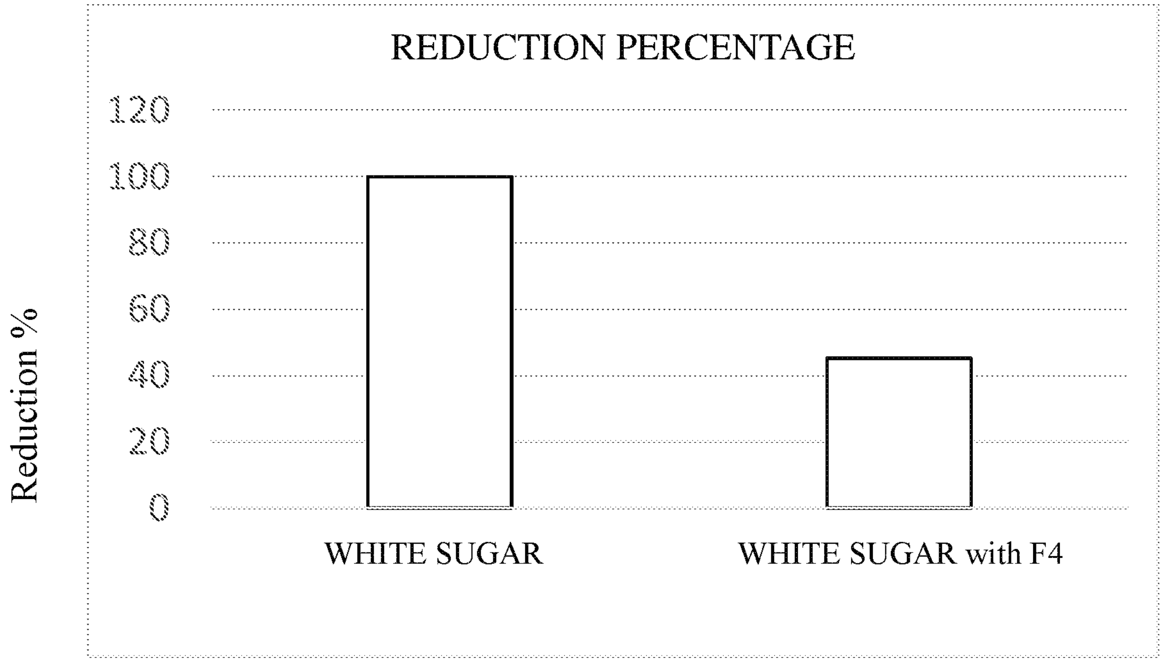
FIG. 5 illustrates the reduction of the glycaemic index, as in Example 6.

FIG. 5 confirms on the other hand the average significant reduction of the glycaemic index, which showed the following surprising percentage values set out below in Table 3.

TABLE 3

| | AREA (mMol/min) MEAN | MEAN QUADRATIC ERROR | % REDUCTION OF THE GLYCAEMIC INDEX |
|---|---|---|---|
| WHITE SUGAR | 48.4 | 5.4 | // |
| WHITE SUGAR WITH F4 | 26.6 | 1.7 | −45.02% |

The statistical analysis conducted with the student test T shows a statistically significant reduction difference of the glycaemic index with F4 with respect to the simple sugar ($P=7\times10^{-5}$), also with lower concentrations of F4 than in the previous examples.

Example 7

Measuring the Glycaemic Index in 2 Different Types of Sugar, after Consumption of 50 g of Sugar.

The objective of this study is to measure the glycaemic response of 2 sugars, after consumption of greater quantities of sugar than in the previous examples.

The following sugars were tested:

1. white sugar;
2. white sugar with added hydrolysate F4 (3%) (Example 5)

The recommended method used also in this study to measure the glycaemic index is the same method disclosed in Example 6.

The glycaemic response was examined after consumption of 50 grams of the 2 products.

The order in which the foodstuffs were tested is randomised.

The glycaemic response was measured in 10 healthy male and female volunteers who had no family history of diabetes or other pathologies associated with an altered glycaemic clinical picture.

For each foodstuff to be tested, the individuals were evaluated on different days and the products were administered in the morning at about 09:00 after a 10-12 hour overnight fast. For each test, a blood sample was taken from the individual who had been fasting. Within the following 15 minutes, the individual had consumed the test foodstuff. Subsequent blood samples were taken 15, 30, 45, 60, 90, 120 minutes after ingestion of the foodstuff, in accordance with the protocol of Wolover et al., During the meal, the individuals could have only water. In order to determine the glycaemia, a full blood sample was used by taking a capillary blood sample using OneTouch Ultra Easy of the company LifeScan, which provides the glucose value in mg/100 ml.

Results and Conclusions

The data after consumption of 50 g of white sugar or white sugar with F4 are shown in Table 4 as an average and mean quadratic error (MSE) of the 10 volunteers, and as a reduction percentage.

Figure 6:
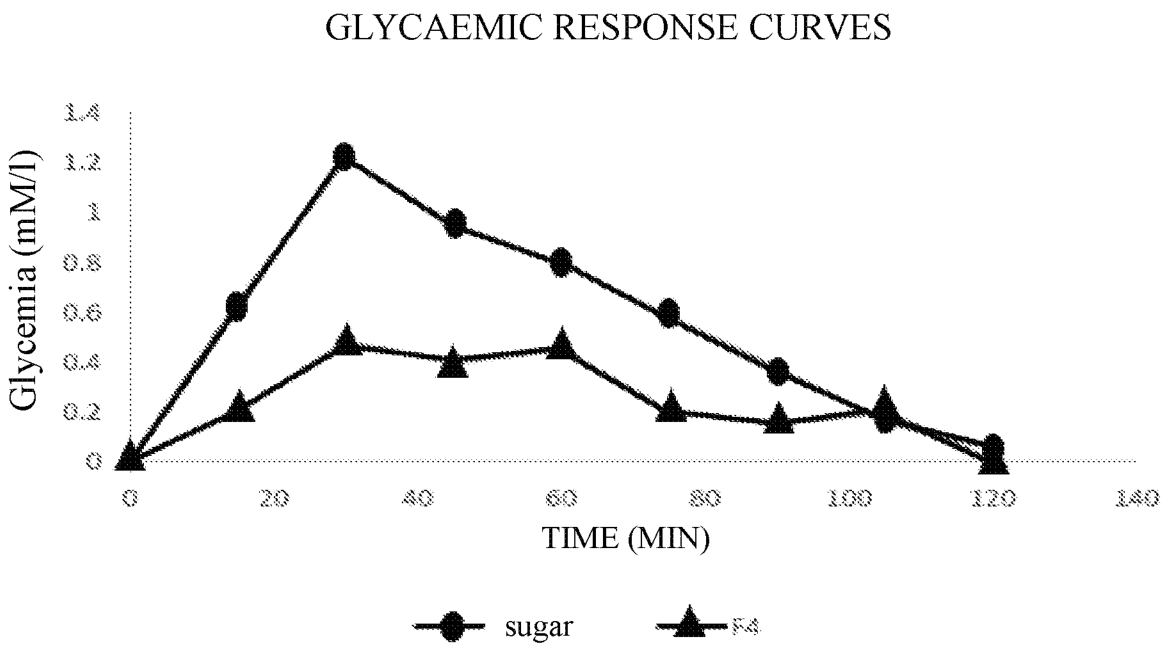
FIG. 6 illustrates the glycaemic curves in response to the white sugar and to the sugar with added hydrolysate of the present invention, as in Example 7.

FIG. 6 shows, as an example, the glycaemic curves of a volunteer in response to the simple sugar (indicator ●) and to the sugar with F4 (indicator ▲).

Figure 7:
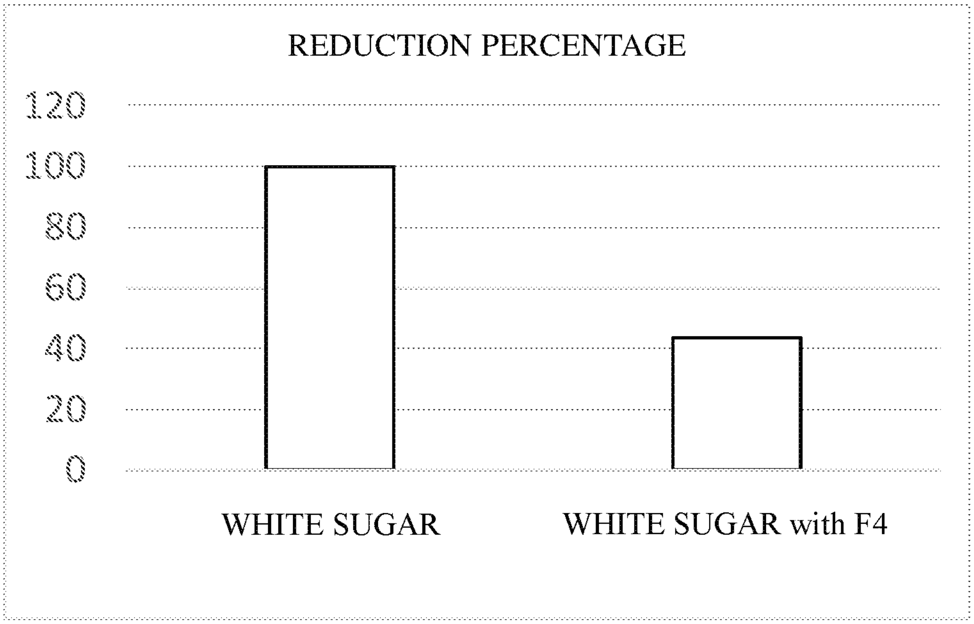
FIG. 7 illustrates the reduction of the glycaemic index, as in Example 7.

FIG. 7 confirms on the other hand the average significant reduction of the glycaemic index, which showed the following surprising percentage values set out below in table 4.

TABLE 4

| | AREA (mMol/min) MEAN | MEAN QUADRATIC ERROR | % REDUCTION OF GLYCAEMIC INDEX |
|---|---|---|---|
| WHITE SUGAR | 72 | 0.25 | // |
| WHITE SUGAR WITH F4 | 40.6 | 6.98 | −43.6% |

The statistical analysis conducted with the student test T shows a statistically significant reduction difference of the glycaemic index with F4 with respect to the simple sugar (p=0.000111516).

Example 8

Determination of the metals in the hydrolysate and in the sugar with the hydrolysate at 3%.

In the following food samples:

semi-refined sugar with hydrolysate extract F4 of Example 5 hydrolysate F4 of Example 1

The following metals were determined by optical emission spectrometry (ICP-OES—"Inductively Coupled Plasma—Optical Emission Spectroscopy"):

1. calcium,
2. zinc,
3. copper,
4. manganese,
5. iron

As in the case of selenium and chromium the lower working limit (ppb-mcg/L) was below the content sufficient for defining the food that was the source of selenium or chromium, the samples were again analysed by atomic absorption spectroscopy (AAS), which showed a lower detectability limit for the two metals.

Adding 3% hydrolysate F4 to the sugar enriches the sugar with 15% calcium, 50-100% iron, 2.5% zinc, 3% selenium, and 4% chromium.

The invention claimed is:

1. Process for the preparation of a hydrolysate from a vegetal matrix, said process comprising the steps of:

i) mixing vegetal matrix and water, in a weight ratio of 1:1 to 1:5, ii) adding to the so obtained mixture up to 2 wt %, based on the mixture weight, of an enzyme complex consisting of:

a) xylanase and pectinase, or b) xylanase, pectinase, amylase and glucanase, and leaving to react for at least 6 hours at a temperature of 45-65° C. and at a pH of 3-6, iii) deactivating the enzyme complex of step ii), by increasing the temperature to 80-90° C. for at least 5 minutes, and iv) separating the liquid component from the solid component as obtained at the end of step iii), while keeping the liquid component, i.e. the hydrolysate from the vegetable matrix, the hydrolysate comprising water, pectins, 10-50 wt % of arabinoxylans and 1-10 wt % of sugars selected from glucose, xylose, arabinose, galactose and mixtures thereof, based on the dried hydrolysate weight, wherein said vegetal matrix is selected from a cereal, *Plantago psyllium, Digitaria eriantha*, bamboo shoots, *Lolium*, beet, their components and their mixtures.

2. The process of claim 1, wherein said xylanase is endo-1,4-beta-xylanase, said amylase is alpha-amylase, said glucanase is endo-1,3(4)-beta-glucanase, and/or said pectinase is polygalacturonase, pectin esterase, or a mixture thereof.

3. The process of claim 1, wherein, in step ii), the enzyme complex is added in an amount up to 1 wt %, based on the mixture weight.

4. The process of claim 1, wherein, in step i), the vegetable matrix and water are in a weight ratio of 1:1.5 to 1:3.

* * * * *